United States Patent [19]

Caravel

[11] Patent Number: 5,613,057
[45] Date of Patent: Mar. 18, 1997

[54] METHOD FOR CREATING A MULTIMEDIA APPLICATION USING MULTIMEDIA FILES STORED IN DIRECTORIES THAT ARE CHARACTERISTICS OF DISPLAY SURFACE AREAS

[75] Inventor: Muriel D. Caravel, Nice, France

[73] Assignee: International Business Machines Corporation, Armonk, N.Y.

[21] Appl. No.: 292,453

[22] Filed: Aug. 18, 1994

[30] Foreign Application Priority Data

Jan. 14, 1994 [EP] European Pat. Off. ............. 94480008

[51] Int. Cl.$^6$ ...................................................... G06T 11/60
[52] U.S. Cl. ......................... 395/806; 395/340; 345/115; 345/118
[58] Field of Search ................................. 395/154, 152, 395/153, 155, 157, 160; 345/115, 118, 127, 132

[56] References Cited

U.S. PATENT DOCUMENTS

| | | | |
|---|---|---|---|
| 4,982,344 | 1/1991 | Jordan | 395/157 |
| 5,297,249 | 3/1994 | Bernstein et al. | 395/156 |
| 5,319,447 | 6/1994 | Garino et al. | 348/708 |
| 5,363,482 | 11/1994 | Victor et al. | 395/157 |
| 5,367,621 | 11/1994 | Cohen et al. | 395/154 |
| 5,408,655 | 4/1995 | Oren et al. | 395/600 |
| 5,414,644 | 5/1995 | Seaman et al. | 364/551.01 |
| 5,428,731 | 6/1995 | Powers, III | 395/154 |

OTHER PUBLICATIONS

*Freelance Graphics*, Lotus Development Corporation, 1993, pp. 6–1 to 6–4, 8–1 to 8–7, 9–1 to 9–9.

*Primary Examiner*—Heather R. Herndon
*Assistant Examiner*—Stephen Hong
*Attorney, Agent, or Firm*—Edward Duffield; Andrew J. Dillon

[57] ABSTRACT

A number of multimedia files representative of video or images information are stored in a set of directories, which are each characteristic of a predetermined surface area required to display the image or video information contained within the multimedia files stored within the director. Upon request by a producer creating an application, a set of multimedia templates are provided. Each multimedia template within the set is comprised of different and possibly overlapping zones, of which each have one of the predetermined surface areas. The producers are then provided with an opportunity to select a multimedia template within the set of multimedia templates, which is then displayed within the display screen. In response to a selection of a particular zone within the selected multimedia template, a window is displayed to the producer containing a listing of multimedia files stored within a directory characteristic of the predetermined surface areas of the particular zone. In response to a selection of a multimedia file within the listing, an entry is automatically stored within memory that associates the selected multimedia file with the particular zone.

10 Claims, 14 Drawing Sheets

Fig. 7

| | | | | | | | |
|---|---|---|---|---|---|---|---|
| h1 | g1 | f1 | e1 | d1 | c1 | b1 | a1 |
| h2 | g2 | f2 | e2 | d2 | c2 | b2 | a2 |
| h3 | g3 | f3 | e3 | d3 | c3 | b3 | a3 |
| h4 | g4 | f4 | e4 | d4 | c4 | b4 | a4 |
| h5 | g5 | f5 | e5 | d5 | c5 | b5 | a5 |
| h6 | g6 | f6 | e6 | d6 | c6 | b6 | a6 |
| h7 | g7 | f7 | e7 | d7 | c7 | b7 | a7 |
| h8 | g8 | f8 | e8 | d8 | c8 | b8 | a8 |

Iron title ● text 510×28 pixels ● image 640×42 pixels

● background image or video or animation 640×480 pixels

● navigation bar  640×51 pixels index | pay | print | help | repeat | quit | return | next

52

53

METHOD FOR CREATING A MULTIMEDIA APPLICATION USING MULTIMEDIA FILES STORED IN DIRECTORIES THAT ARE CHARACTERISTICS OF DISPLAY SURFACE AREAS

BACKGROUND OF THE INVENTION

1. Technical Field

The invention relates to data processing and more particularly to a method for creating a multimedia application.

2. Description of the Related Art

Multimedia is expected to be a highly expanding branch of the data processing and computer field since it provides the user with an easy and effective access to information contained in various media, such as video, sounds, images, and data.

Typical examples of background multimedia applications can be found in the following documents:

"Visual Programming abstractions for interactive multimedia presentation authoring" Loegel, J. F. Rutledge, J. L. Heines, IEEE Comput. Soc. Press, Seattle, Wash., USA, 15–18 Sept. 1992.

"A new communication tool: time dependent multimedia document" Yoneda et al., Fac. of Sci. & Technol:, Keio Univ., Japan, IEE Compt. Soc. Press, Yokohama, Japan 9–12 June 1992.

"Tool support for the synchronization and presentation of distributed multimedia", G. Blakowski et al., Computer Communications, vol. 15, n 10, December 1992, page 611;

"Hypermedia, multimedia and hypertext: definitions and overview", H. Bornman et al., The electronic Library, vol. 11, n 4/5, August/October 1993.

"Windows shopping, Pricey and Elegant Multimedia Development", Byte, August 1990, page 114–156.

"Generating multimedia presentations automatically using TYRO, the constraint case based designer's apprentice", R. MacNeil, IEEE Comput. Soc. Press, Proceedings. 1991 IEEE Workshop on Visual Languages 1991 P74-9.

"Object description and representation for visual and multimedia databases," M. Rhiner, IFIP Trans. A, Comput. Sci. Technol: (Netherlands) Vol. A 7 1992 P331-45.

It appears from all these prior art references that the multimedia technological field has two major characteristics.

First, it should be noticed that this particular field of technology is mainly intended for users who are not programmers or computer engineers. Indeed, the creator of a multimedia application is typically a user who is more an artist than a technician who is well-versed in the software commands and tools existing in the data processing field.

Additionally, it appears that some of the existing multimedia data processing tools have significant drawbacks when applied to particular multimedia information. This is the case, for example, with some software commands which allow the user to rotate and magnify graphical objects and images. The use of these commands entails the execution of corresponding software routines to perform the desired function, for example, rotation or magnification. However, these routines, when applied to a file containing an original image, may have some adverse effects on the quality and esthetics of the original images when displayed on the screen.

Therefore, there is a need for an easy way to create multimedia applications that requires only a minimum amount of knowledge in the data processing field. Additionally, it is desirable to minimize the effects of creating multimedia applications on the quality of the images or video which are originally stored within the system.

SUMMARY OF THE INVENTION

According to the present invention, a method for creating a multimedia application is provided, which involves the steps of: storing different multimedia files representative of video or images information in a set of n predetermined directories, a directory being characteristic of a predetermined surface within a display screen required to display image or video information contained within said multimedia files stored within said directory; responsive to a request by a producer creating the application, providing a set of multimedia templates comprised of different and possibly overlapping zones, each of said zones having one of said predetermined surface; providing the producer with an opportunity to select a particular zone on the screen; responsive to a selection, displaying a window to the producer containing the files stored in a particular directory, either images or videos, which exactly correspond to the surface of said selected zone.

This method enables the user to create a multimedia screen with images or videos which exactly "fit" in the particular zone where he wishes to display the information. This technical result is obtained without the necessity of using complex software commands and tools which are generally required to manipulate the images, their position (in terms of x-y coordinates) on the screen, and their size. Additionally, since no processing of the files is involved (for example, a magnifying process), the quality of the information is not affected.

Preferably, the method includes a step of providing the producer with a separate display of video files, images files, and animation files.

In a preferred embodiment of the invention, the method includes the step of first displaying the template which is most frequently used for creating a particular multimedia screen. Only a limited number of templates, 10 in a preferred embodiment, are practically required for creating any kind of multimedia application. Therefore, the step of ordering the set of templates as a function of their effective utility, and then displaying them in the appropriate order greatly enhances the facility and rapidity of use of the method by the producer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2 through 11 are illustrative examples of the templates which are used in a preferred embodiment of the invention to create a wide variety of multimedia screens.

DETAILED DESCRIPTION OF PREFERRED EMBODIMENT

Figure 1A:
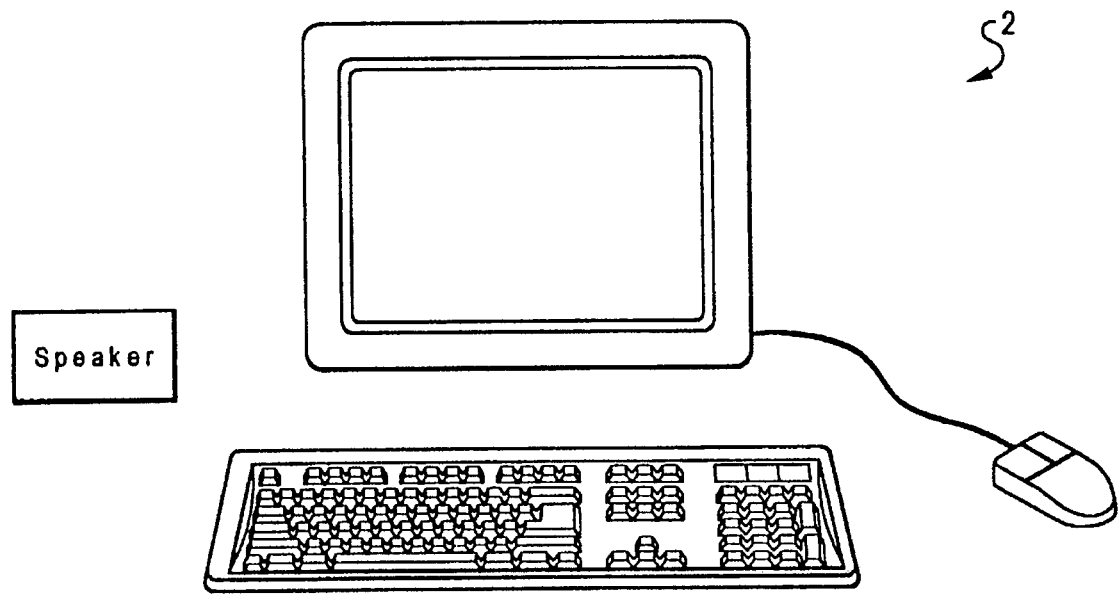
FIGS. 1A and 1B are illustrations of a data processing system for developing multimedia applications in accordance with the present invention.
Figure 1B:
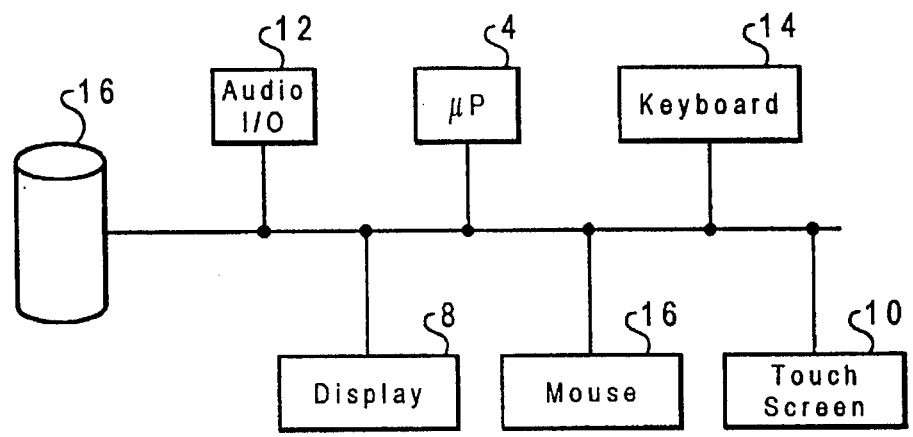

In FIGS. 1A and 1B a data processing system for execution of a multimedia application in accordance with the method of the invention is shown. System 2 includes a processing means 4, a memory means 6, a display means 8, a touch screen 10 overlaying the display means 8, and audio output means 12. The data processing system for executing multimedia applications could be the same as the one for developing them, but normally it would not be necessary for the second system to have a keyboard 14 or a mouse 16, since the necessary input from an end user to the system would be done using the touch screen 10.

Figure 2:
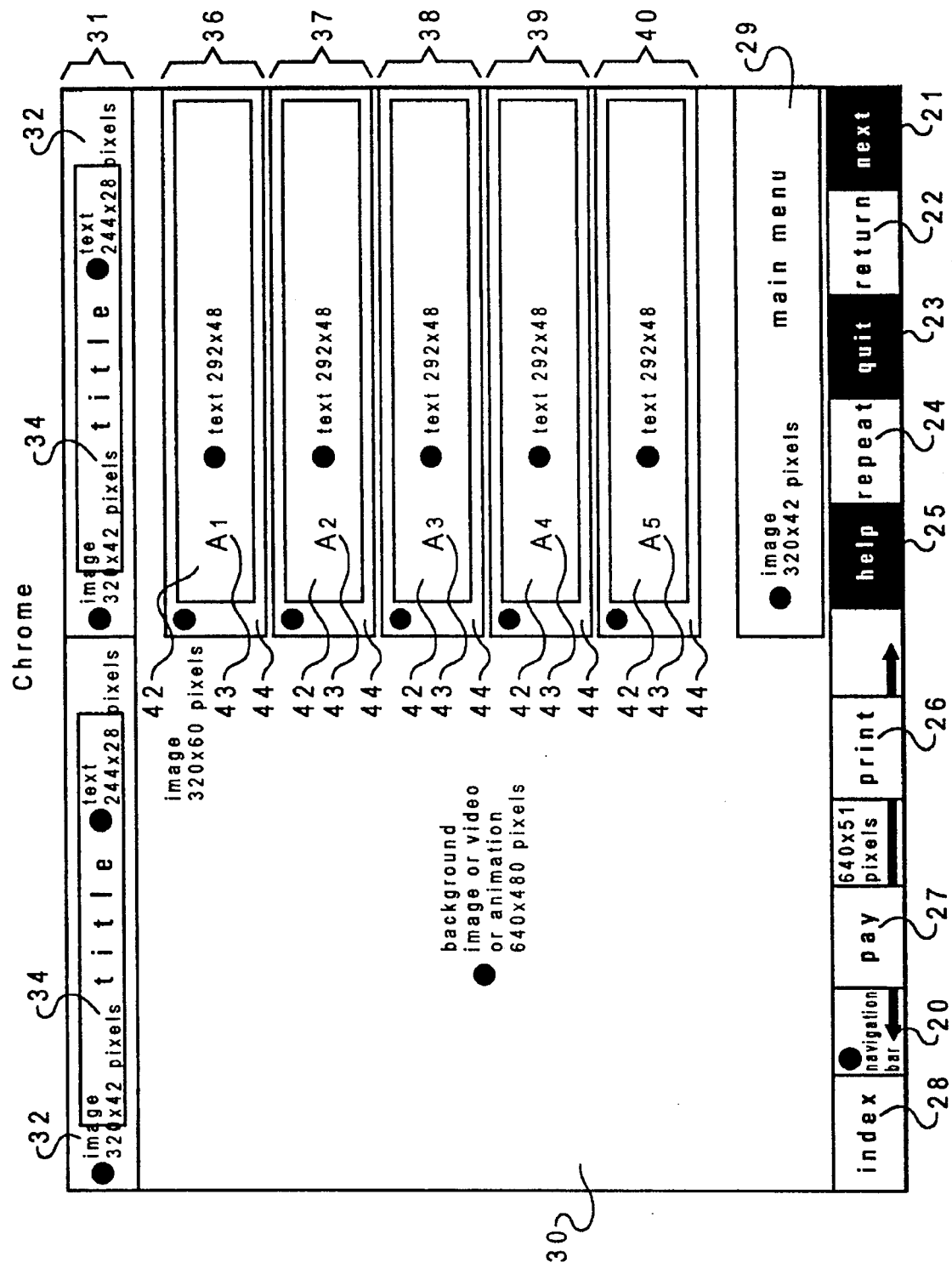

In the current invention, to enable a producer to construct interactive multimedia applications, a set of templates has been provided. One of these templates (chrome) is shown in FIG. 2. Each template is unique and designed in a certain way, so that the combination of all the templates will offer a multimedia producer a flexible and efficient base for creating multimedia applications. A preferred embodiment has ten different templates, but it would be possible to provide any number of templates.

A template according to the invention can be seen as the framework with which a producer can build an interactive multimedia application. Each template consists of a number of predefined zones of different types and sizes. The zones are utilized by a producer as the display surfaces of the different multimedia objects belonging to a script, and can be selectively defined to represent different functions. Certain zones will be responsive to user input to the computer during the execution of the multimedia application. These zones will be represented by unique identifiers on the template. The zone identifiers are used during the Link Phase to indicate which screen should be displayed when the user touches the screen on the location of such a touch sensitive zone. Examples of touch sensitive zones are buttons and cells, for which the functionality is explained below. Other zones, such as the screen background, for instance, will be used to display an image, a video sequence or an animation, but will not offer to the end user a choice of action, and will therefore not need to be touch sensitive or to be linked to another screen. The data processing system would then only memorize the type of multimedia object in conjunction with the zone the producer wants to connect.

The templates will be created and saved as "screens" during a "Create Screens" phase, in which the different multimedia objects are being attached to the respective zones. The completed screens are then linked to each other by the system in the "Link Screens" phase.

All templates of the invention share certain characteristics. They all contain navigation bar 20 at the bottom of the screen, which is identical for all templates. On navigation bar 20, navigation buttons 21–28 are provided. These buttons each have a predefined function already implemented in the system in order to relieve the producer of the responsibility of coding the functions necessary to control the execution of the created multimedia application.

Although the function of each navigation button is defined, the design of the buttons for the created application is not. The producer must provide the information to be presented on the screen, while the invention provides the tools for constructing the application.

As shown in FIG. 2, navigation button 21 at the right end of the navigation bar is named "next". The function of this button is to leave the current screen and to call up the next screen during an execution of the multimedia application. The button is activated when the producer selects it, for example, by clicking on it with the mouse. The button will then be linked to an image, in the procedure described in the "Create Screen" paragraph below, and an entry will be made in memory indicating that for this screen the "next" button will be displayed and functional. During the "Link screens" phase (described below) the button will be linked to the following screen in the application.

All zones on a template are by default inactive, and must be activated by the producer and linked to a multimedia object (image, video, etc.) to be functional during the execution of the application.

"Return" navigation button 22 is made functional in the same way as the "next" button, but its purpose is to display the screen before the current one. Pressing "quit" navigation button 23 starts the execution of a "quit" screen, for example, an evaluation questionnaire for the user. The linking between the "quit" button and the "quit" screen will be performed in the "Link Phase". "Repeat" navigation button 24 restarts the execution of the screen, including any video or sound sequences.

"Help" navigation button 25 will be linked to a help application. The help application works in the same way as the main application with templates and all multimedia options. The only difference is that "help" navigation button 25 on navigation bar 20 of a help screen will be marked to indicate that pressing the button will take the user back to the main application. However, nothing prevents the producer from creating a help application with a large number of screens and integrating sound and video just as in the main application.

"Print" navigation button 26 will be activated when the producer wants to connect the system to a printer. In that case, instead of linking the button to another screen, the button will be linked to a print control routine.

The files containing print control routines will be stored in a separate directory, just like the different types of multimedia objects. When creating the application, the producer will be presented with a list of print control routine files to connect to print navigation button 26.

"Pay" navigation button 27 will be activated by the producer when the user will have to pay for something and could, for example, connect the system to a credit card reader. The control files for the "pay" function are located in a separate directory in the same way as the "print" files are.

The implementation of routines for connecting a system to a printer or credit card reader is well known and documented in the prior art, and will not need to be further described here.

The last navigation button is "index" navigation button 28. Pushing index navigation button 28 will bring up the index to the screen, which would enable a user to search for a certain subject or screen, for example. The novel method used in the invention to create the index is explained in greater detail below.

A certain distance is kept between some of the navigation buttons so that the producer, when creating the screens, can see and select the navigation bar in order to associate an image with the navigation bar. When a navigation button is inactive in the running application, it will not be visible to the user, but the navigation bar will be shown instead.

Some of the templates are equipped with a "main menu" button 29. The function of this button is to restart the initial screen of the application.

In addition to navigation bar 20, each template consists of background 30 and title zone 31. On background 30, images, video sequences or animations can be displayed, provided that they share the same format as the background, which is 640×480 pixels in a preferred embodiment.

Title zone 31 of the template in FIG. 2 is divided into two parts in order to display a title for each part of the screen, if necessary. Each part consists of two zones, image zone 32 to display images, and text zone 34. The producer can activate one or both of these zones by clicking on them if a title is required in the application.

The template in FIG. 2 also includes push buttons 36–40, labeled A1–A5 respectively. Push buttons 36–40 are activated when the producer wants to offer a user different options of where to go next. The push buttons 36–40 consist of image zone 44, text zone 42, and have identifier 43 assigned to them (A1 to A5). If a push button is activated, the identifier is stored together with the template name in memory, and will be used in the "Link Screens" phase to connect the button to a screen to be executed when an end user pushes the button.

Figure 3:
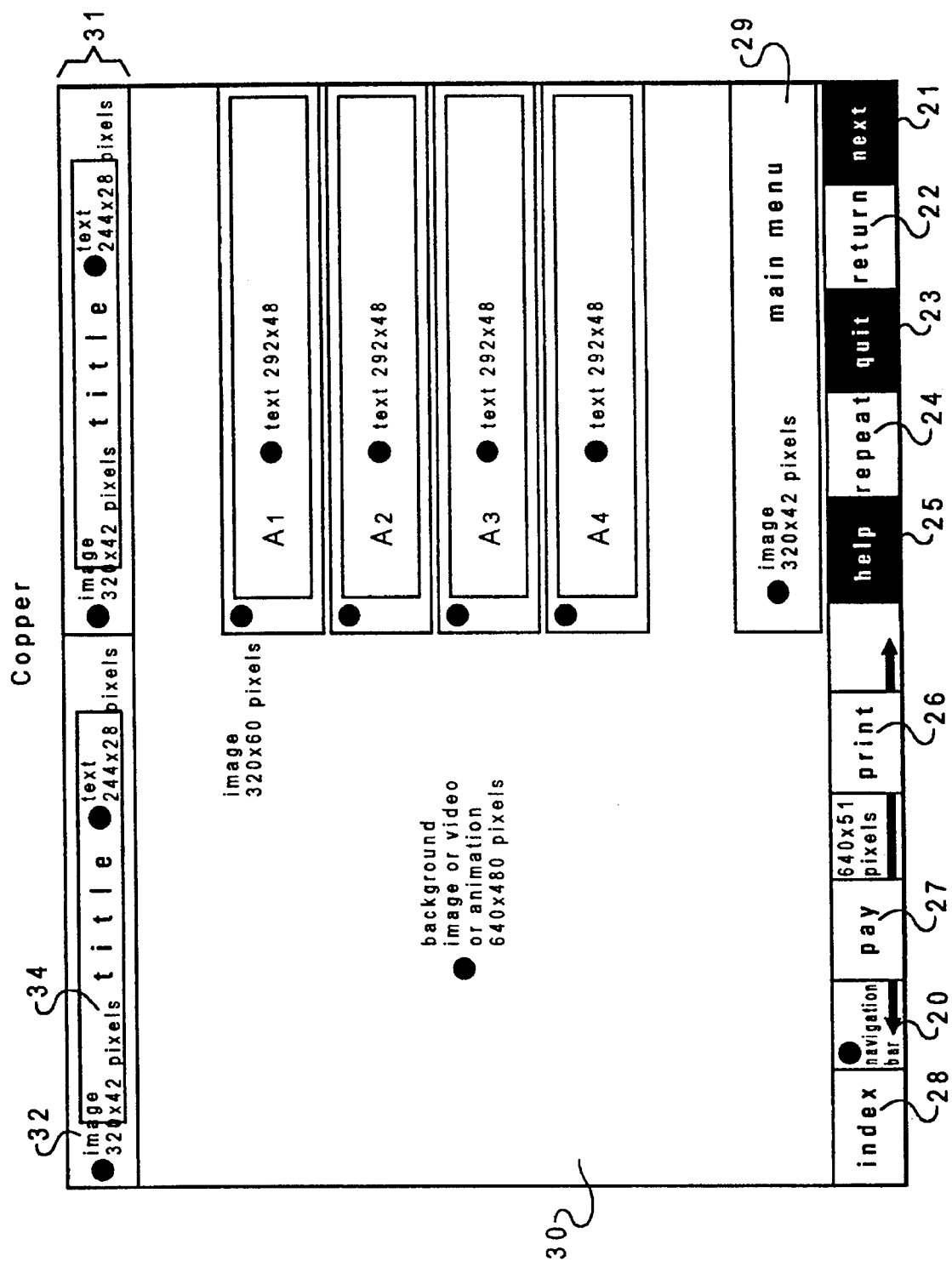

The template of FIG. 3 (copper) is similar to the template in FIG. 2, except for a different disposition and number of push buttons on the template.

Figure 4:
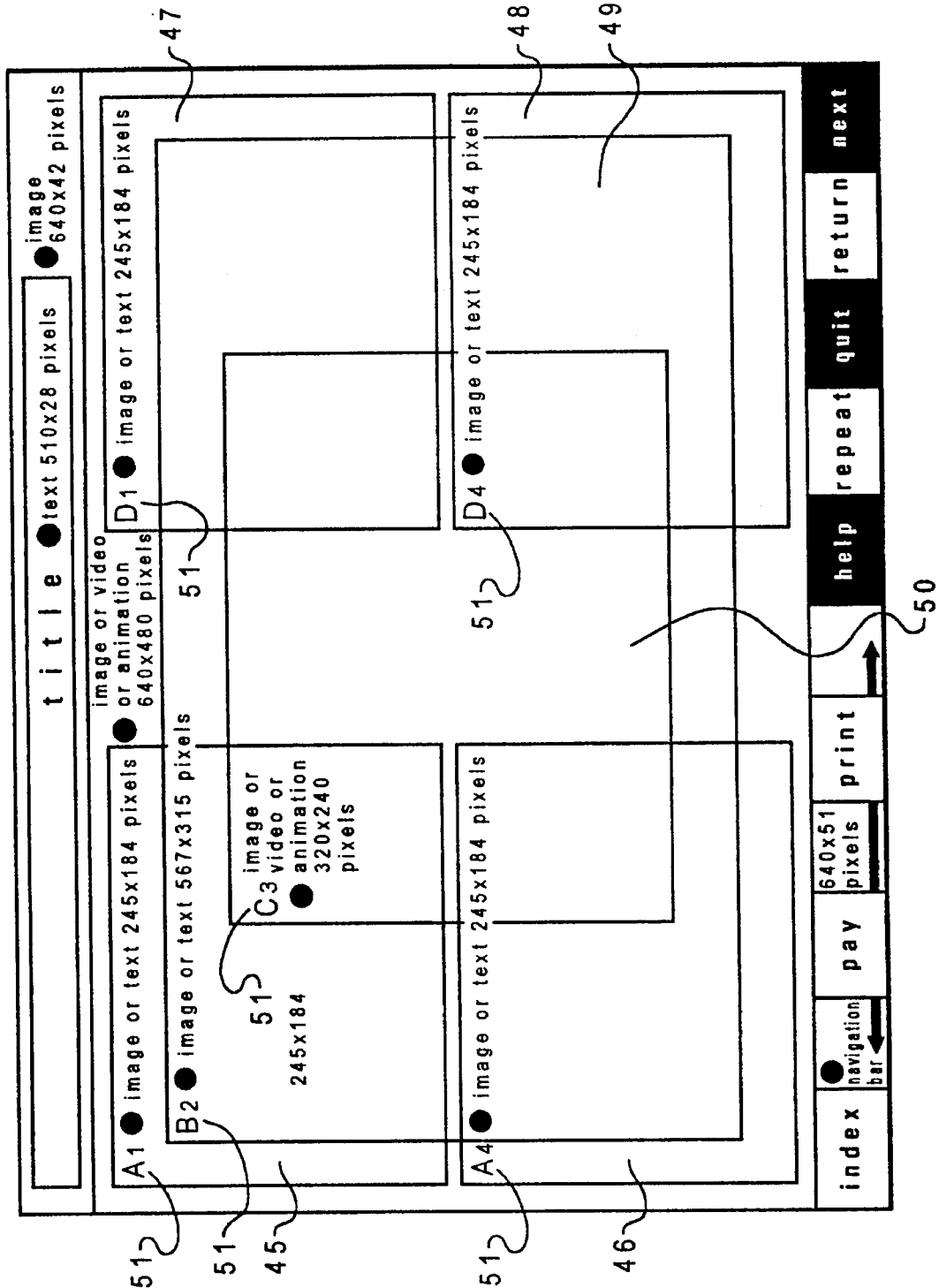

FIG. 4 shows another template (neon) of the invention. This template has six touch sensitive zones 45–50, each with its respective identifier 51. Any number of zones can be activated, and can be assigned to different multimedia objects. Zone 50, labelled C3, could in this case simultaneously show an animation and at the same time respond to being touched, for example, by playing a sound.

Figure 5:
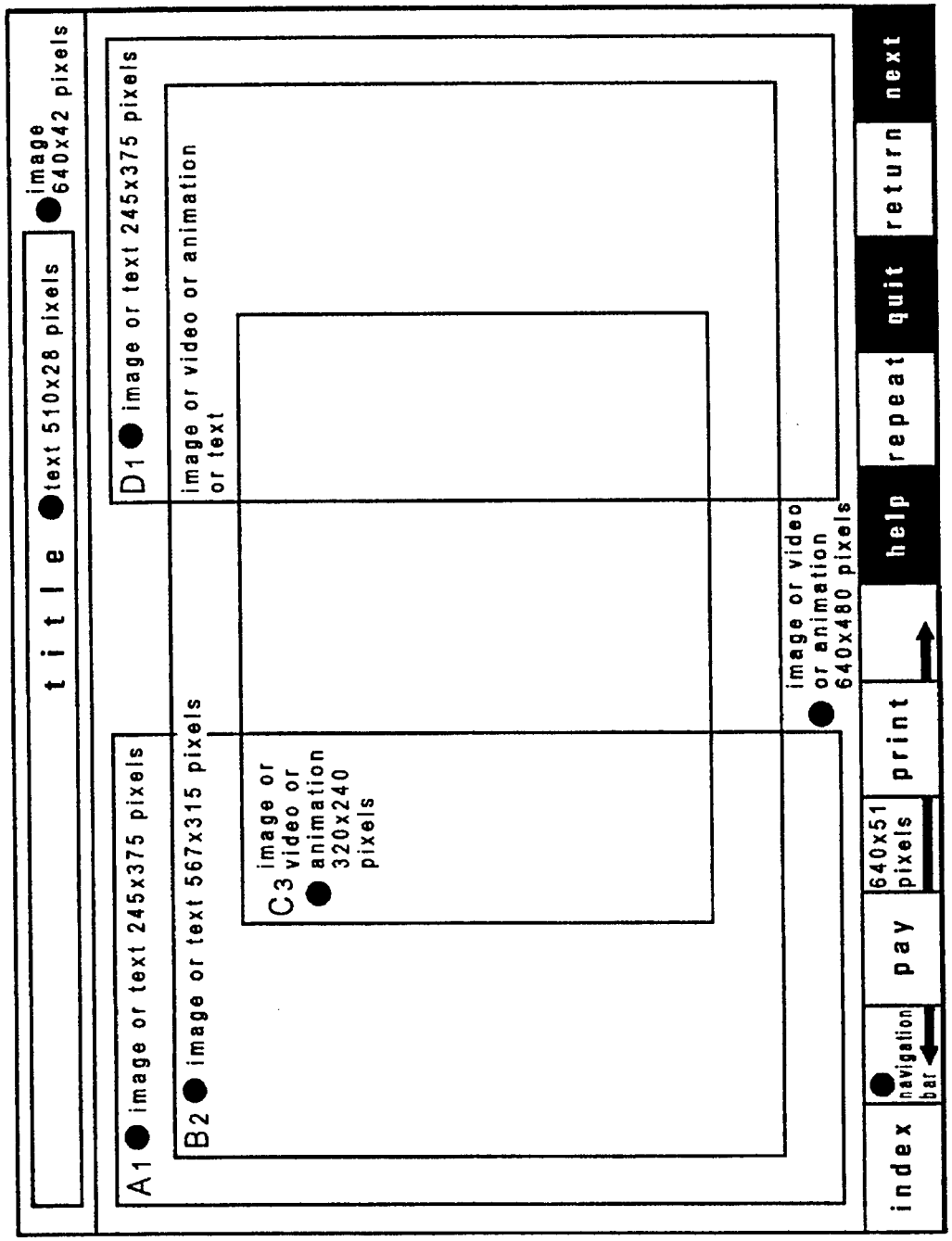

In FIG. 5 a template (palladium) very similar to the one in FIG. 4 is displayed. This template offers zones capable of displaying text or images in a different format from the zones in FIG. 4.

Figure 6:
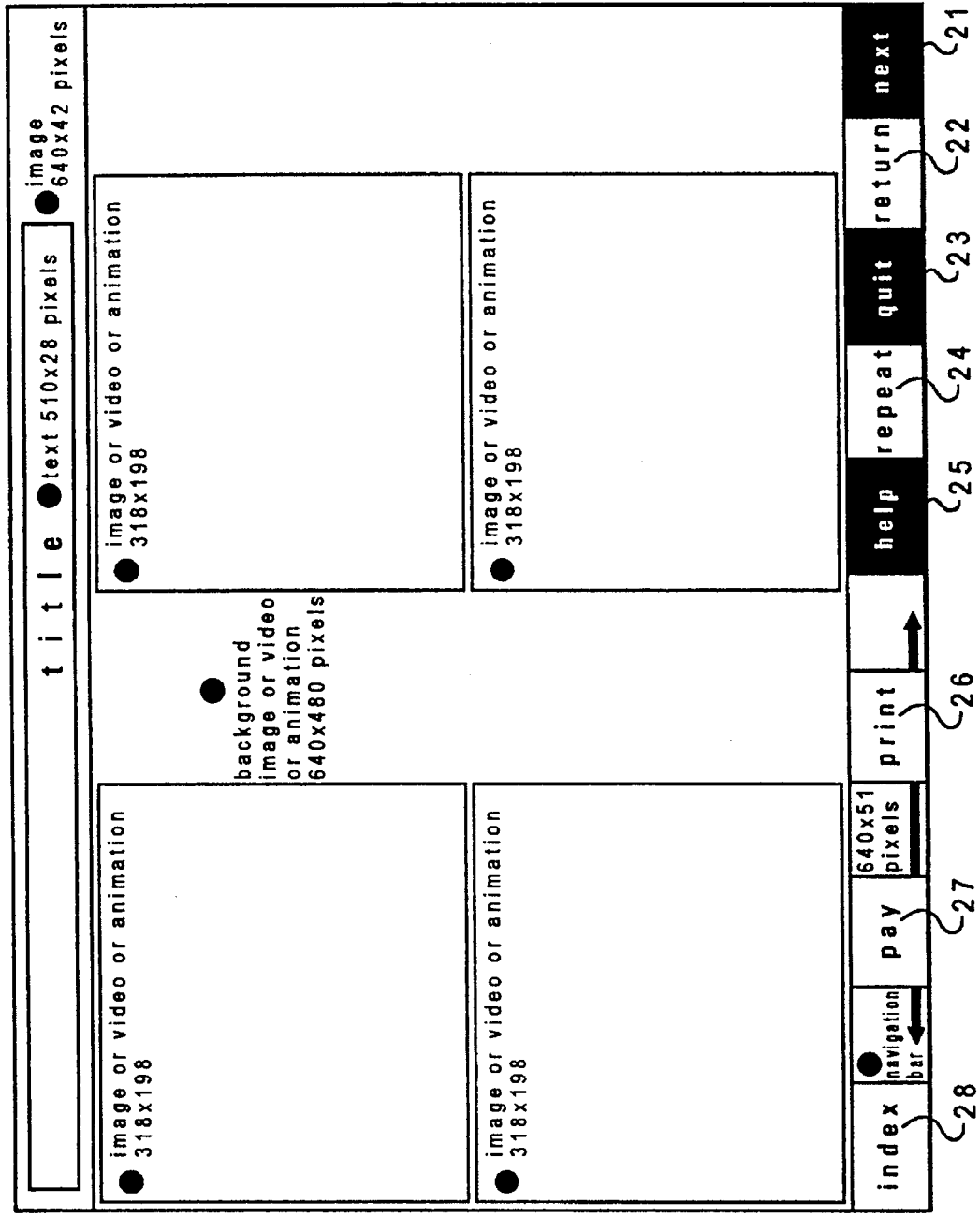

FIG. 6 (silver) is different from FIGS. 4 and 5 not only in the layout of the zones, but also in that the zones are not touch sensitive. This template would typically be used when the producer wants to display information on the screen without the need for user input. Navigation buttons 21–28 can of course be activated if the producer finds it necessary.

FIG. 7 (iron) consists of background 52 and a matrix of "cells" 53. Cells 53 each have a unique identifier that can be activated during the "Create Screens" phase, and linked to another screen during the "Link Screens" phase. The size of the cells is chosen to be approximately the size of a finger tip. A likely use of this screen is to display information on the background and allow the user to point at an object that interests him.

An example of the use of this screen could be to display a map of Paris on the background of a screen, with the most important tourist attractions marked at their respective locations. The cells located at the marked tourist attractions could then be activated by a producer and linked to screens showing detailed information about the chosen subject. During execution, when a user points to a tourist attraction on the screen, the system will follow the link to find and execute the corresponding information screen.

There are no predefined smaller zones in this template to show images or videos of a different format from that of the background, as is the case of the zones within the template in FIG. 4, for instance. If the producer would like to have a video or an animation running on a part of the screen, while still using the template of FIG. 6, the current invention provides a means for that as well. All the producer has to do is to create a screen using another template, the template depicted in FIG. 4, for example, to select videos, animations or images as desired, and then to use this created screen as background for the template of FIG. 5. The system will present the producer with the choice of all multimedia objects corresponding to the size of the zone, as explained earlier. Since the backgrounds are all the same size, it is possible to use a previously created screen as a background of another template. The producer can therefore create screens of great variety and complexity, only limited by the system resources (memory size, video capacity, etc.), even though the number of templates is limited.

Figure 8:
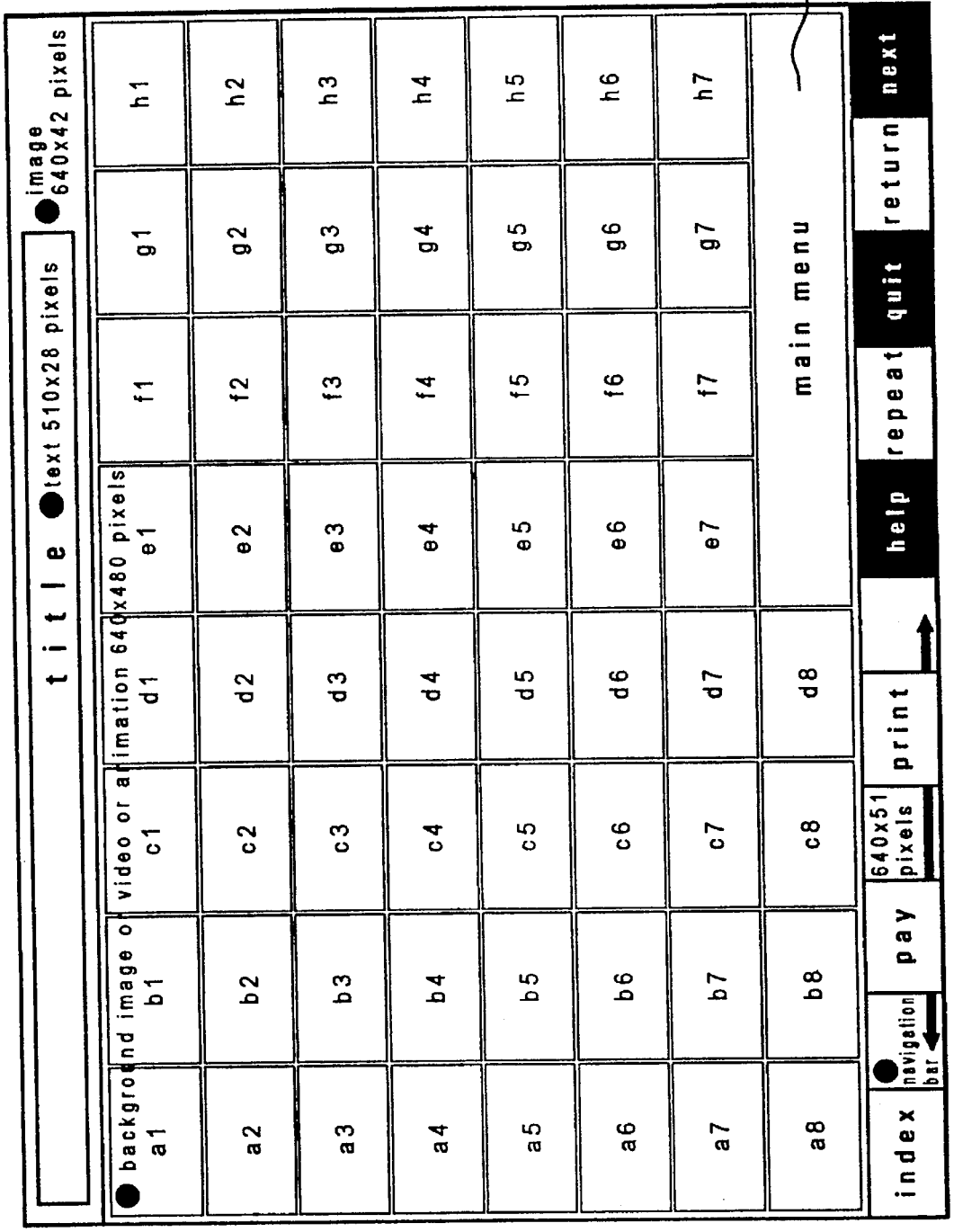

FIG. 8 (oxygen) is identical to FIG. 7 except that the template depicted in FIG. 8 contains the option of activating main menu button 54.

Figure 9:
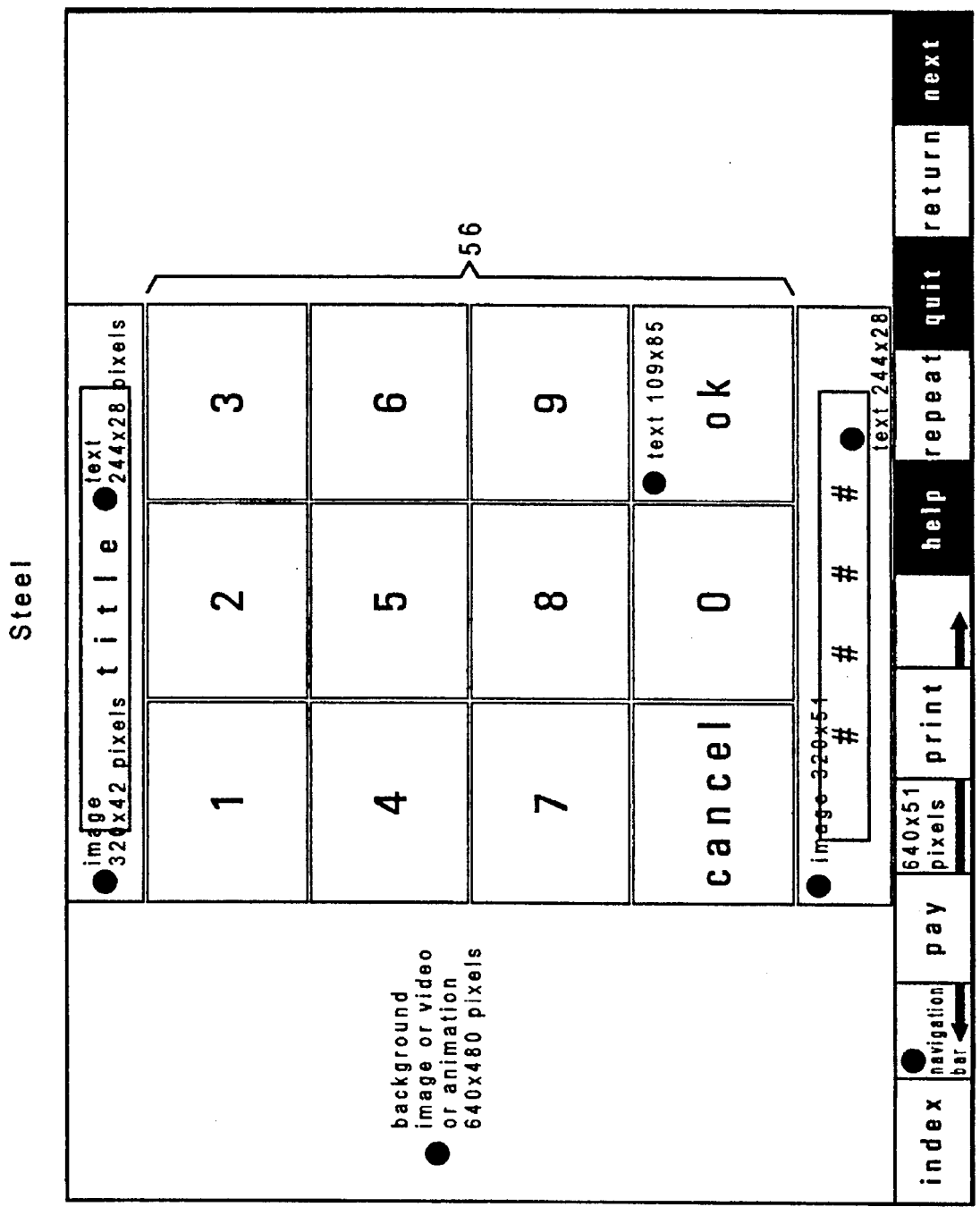

The template (steel) in FIG. 9 contains touch sensitive buttons 56 corresponding to different numbers 0–9. These buttons are functional in that they input the assigned number to the data processing system when being pushed by a user. The producer will provide the image to be shown on the buttons during the "Create Screens" phase. Normally the images would in some way indicate the function of the button (i.e., the assigned number), but the nature of the information to be presented on the buttons is left up to the producer, as in the other templates. This template can be used when the producer wants to prompt a user for numbers, for example, the PIN code of his credit card.

Figure 10:
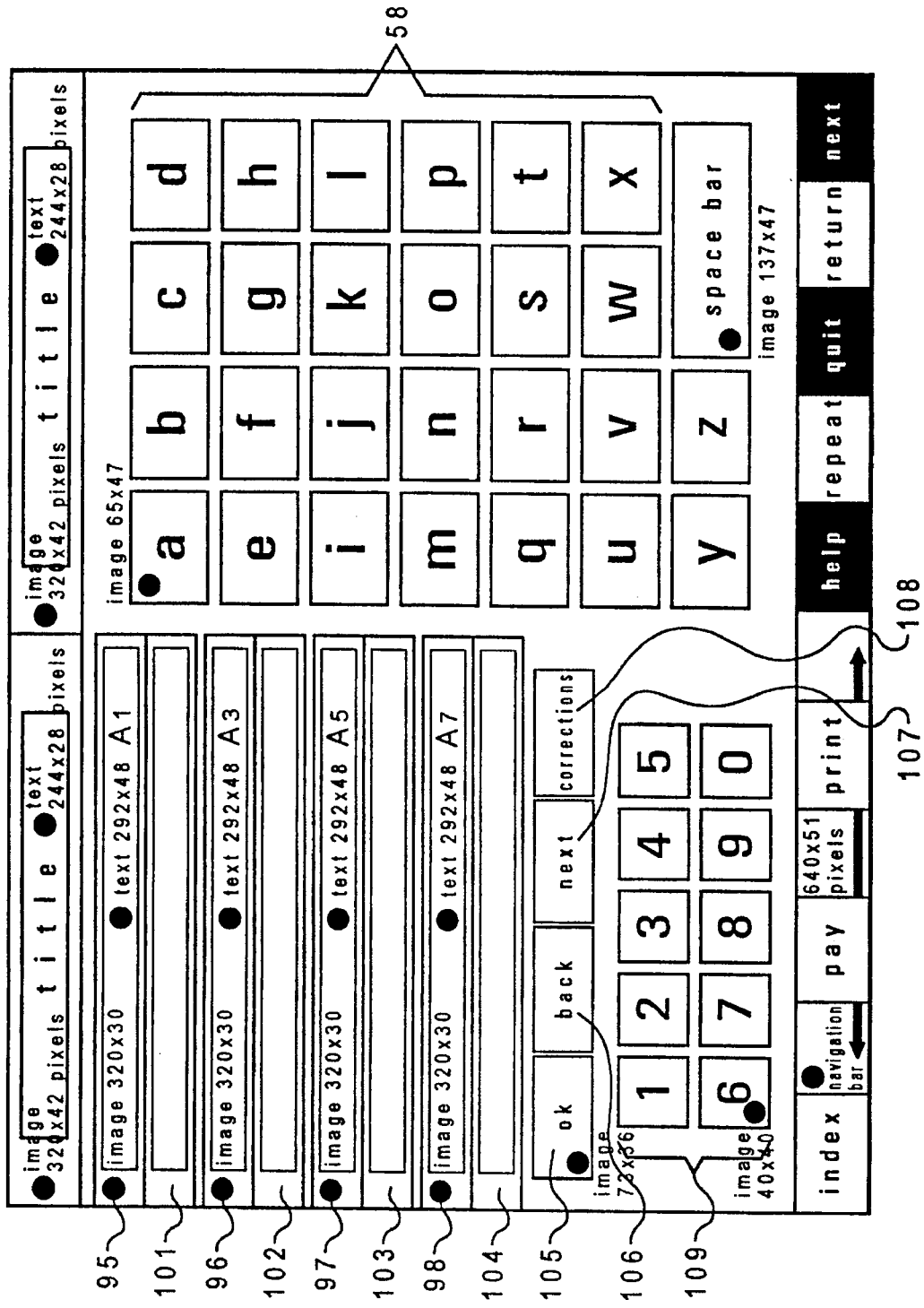

The following template (plutonium) of FIG. 10, offers on the right hand side a set of buttons 58 linked to the characters of the alphabet. This template can provide the base for feedback request from the user. The zones 95–98, labeled A1–A7, will for instance be used to display questions to the user, whose responses will be displayed in character input zones 101–104. The template also contains four buttons 105–108, labeled "OK", "back", "next" and "corrections", respectively, for moving between the different questions and to signal the completed responses. Buttons 109, which represent numbers, are provided in the bottom left corner of the template to enable the user to enter numbers.

Figure 11:
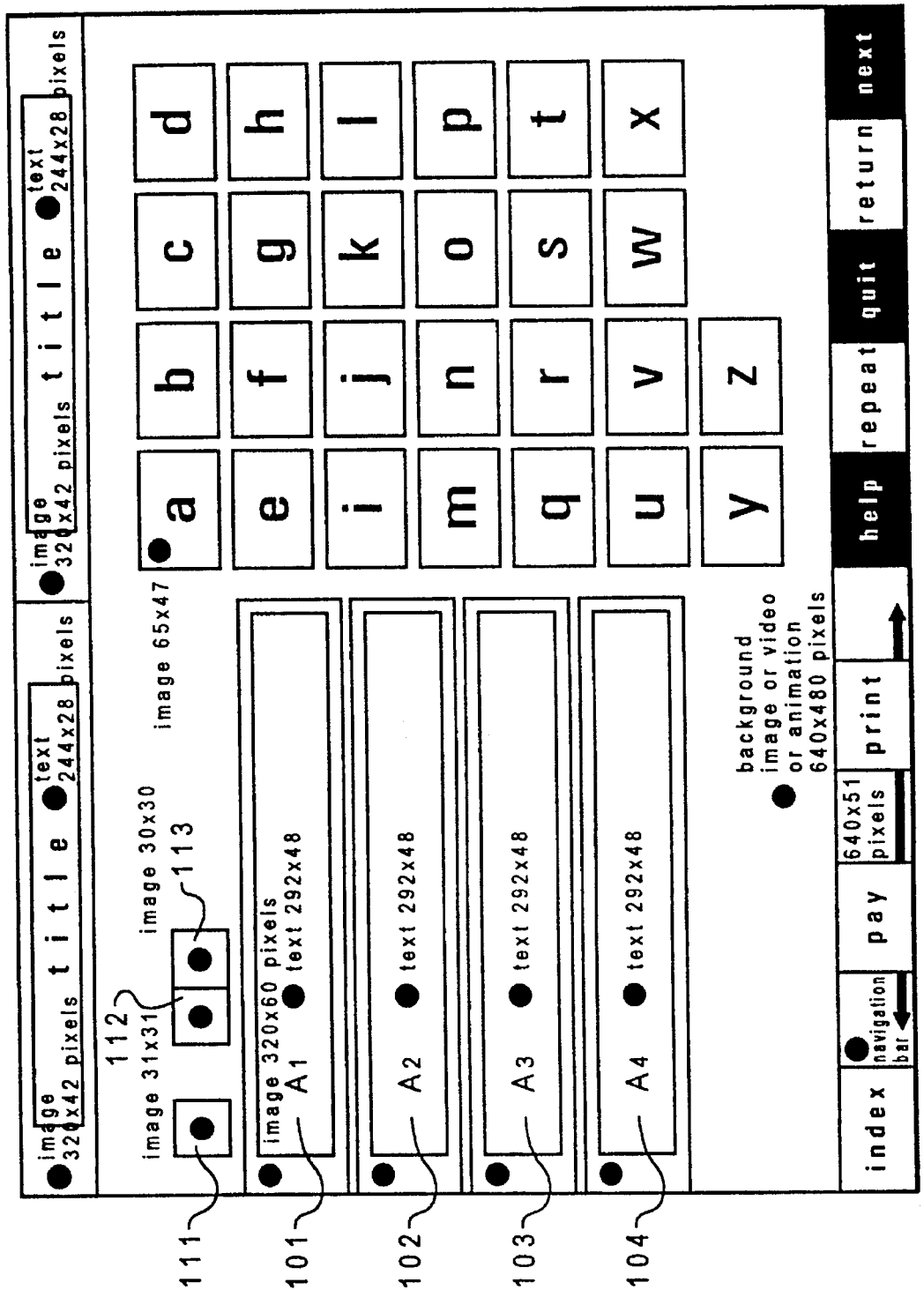

The last template of the preferred embodiment (index), is displayed in FIG. 11. This template is provided for the special function provided in the invention, which lets the producer create an index of the screens in the application, which can be offered to the user as a means for bringing up a screen corresponding to a certain subject. The template therefore may provide character input zones as in FIG. 10 (not illustrated) and push buttons 101–104 of the same functionality as in FIG. 2. The purpose of push buttons 101–104 is to display a part of the index, based on the character(s) input by the user. As described in detail in the description of the "Link Screen" phase, the entries in the index will each be linked to a screen, so that when the user pushes the button on which the entry is displayed, the screen corresponding to that entry will be executed next. Button 111 can be used to display the current location in the index (e.g., the button can display an "a" when the user browses through entries beginning with an "a"). Buttons 112 and 113 are implemented as arrow keys, which are activated by the producer when he wants to offer the user a means for searching through the index sequentially.

Figure 12:
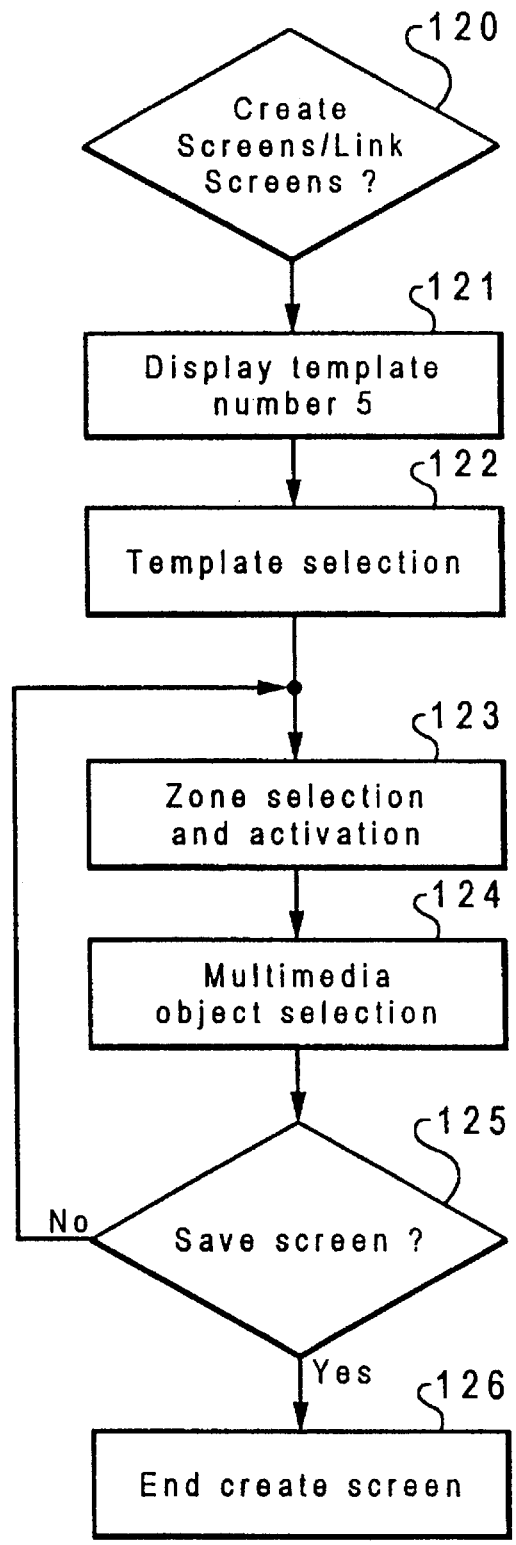
FIG. 12 is a flow chart illustrating the different steps involved in the method of the present invention.

FIG. 12 shows a flow diagram representing the different steps involved in creating the screens of a multimedia application according to the preferred embodiment of the invention. In block 120 a multimedia producer will be presented with the option to choose whether to create or link screens. The first choice when starting to develop a multimedia application would be "Create Screens".

After the producer has chosen "Create Screens", the flowchart continues with block 121, where the most commonly used template, in the preferred embodiment template number 5, will be displayed on the computer display.

If this is not the desired template, the producer can search through the list of templates by using the different mouse buttons as depicted in block 122. By clicking the left button, template number 4 will be displayed, clicking again the same left mouse button will display template number 3 and so on. Similarly, clicking the right button will display template number 6, and thereafter template number 7, etc.

The templates are organized so that the most frequently used screens are located in the middle of the list, i.e., template number 5 being the most frequently used template, thereafter numbers 4 and 6, with templates number 1 and 10 used least frequently. In this way, the producer will reach the most commonly used templates first, which will accelerate the process of template selection since these are more likely to be chosen. When the desired template is shown on the screen, the producer activates it by double clicking with the mouse button. The system will then create a special Link File in memory representing the screen with which the producer is currently working.

The Link File is an important part of the invention, since it will be built up during the "Create Screens" phase, to be used during the Link Phase to link together the different screens constituting the multimedia application. After a template has been selected, it will be displayed on the screen during the rest of the "Create Screens" phase, indicating to the producer the available buttons and fields of the current template.

The following step, depicted in block 123 of FIG. 12, consists of selecting and activating the part of the screen the producer wants to work with next.

This is done by clicking on the screen inside one of the different zones representing a button, cell, field, title or background. If the selected zone represents a button or a cell, the link file will be updated with the name of the button or cell. The link file will later be used, as seen in the description of the link phase below, to offer the producer a means for linking the screens in the order they are to be presented to an end user. On activation of a zone, the producer will be prompted to define what multimedia object will be displayed in this zone as illustrated in block 124. If several objects can be associated with the zone, for example, images, video sequences or animations having the same resolution as the zone (for example, 640×480 pixels), the producer will be prompted to choose which one of these objects he wants to have displayed in this zone.

Multimedia objects of different types and sizes are stored separately in memory. In this way it is possible for the system to display a list on the screen with just the objects that will "fit" into the activated zone. Thus, it is not possible for the producer to select another type of information, or a different size of image than the zone was designed for. This technical feature is particularly advantageous when considering the fact that the producer is not well versed in the fields of data processing and computer programming. In the preferred embodiment, the different files are separated by being stored in different directories in the memory of the multimedia data processing system. One could imagine in this case, that one directory contains all files with video sequences having a resolution of 640×480 pixels, a different directory stores images of the same resolution (640×480 pixels), and a third directory contains video files with a resolution of 320×240 pixels. Additionally the producer is given the ability to create his own image and video files and to introduce them into the application by storing them in the appropriate directory. If the producer elects to show an image in the selected zone on the screen, all images that can be shown at that location (but no other images) will be presented to the producer in a file list in a window on the screen and the producer will be prompted to select one of the file names representing an image by clicking on the file name representing the image to be used. The chosen image will be read from the directory and displayed at the location of the zone from that moment on as depicted in block 125.

When the producer has made the correct selection, he can immediately continue with the next step, perhaps selecting another button, without having to worry about saving the already made selection, since the identifier and the chosen image are automatically memorized when chosen, and also displayed on the screen from that moment on. The fact that the multimedia object is displayed at the location of the zone, gives the necessary visual indication that the intended operation has been registered internally in the computer.

If the producer dislikes the choice of image just made, he clicks inside the zone again in order to inactivate it and disassociate the image from the zone. This feature is integrated in the logic behind block 123, where if a user clicks in an already active zone, the zone is deactivated and deleted from the Link list. In this way, it is not even necessary for the producer to know the name of the file he wants to use, since he can display the different objects on the screen one after the other until he finds the one that he prefers. When this object is displayed on the screen, the producer can return to block 123 to select another zone, or save this screen as depicted in block 126 if no more objects are to be included.

The purpose of the link phase is to connect the particular screens which were created by the producer during the "Create Screens" phase, in accordance with a particular scenario (or story board) which he intends to embody in the final application. This will be achieved, as described below, by creating links between the screens, with regard to the possible actions a user can take during the execution to change the order in which the screens are displayed.

Figure 13:
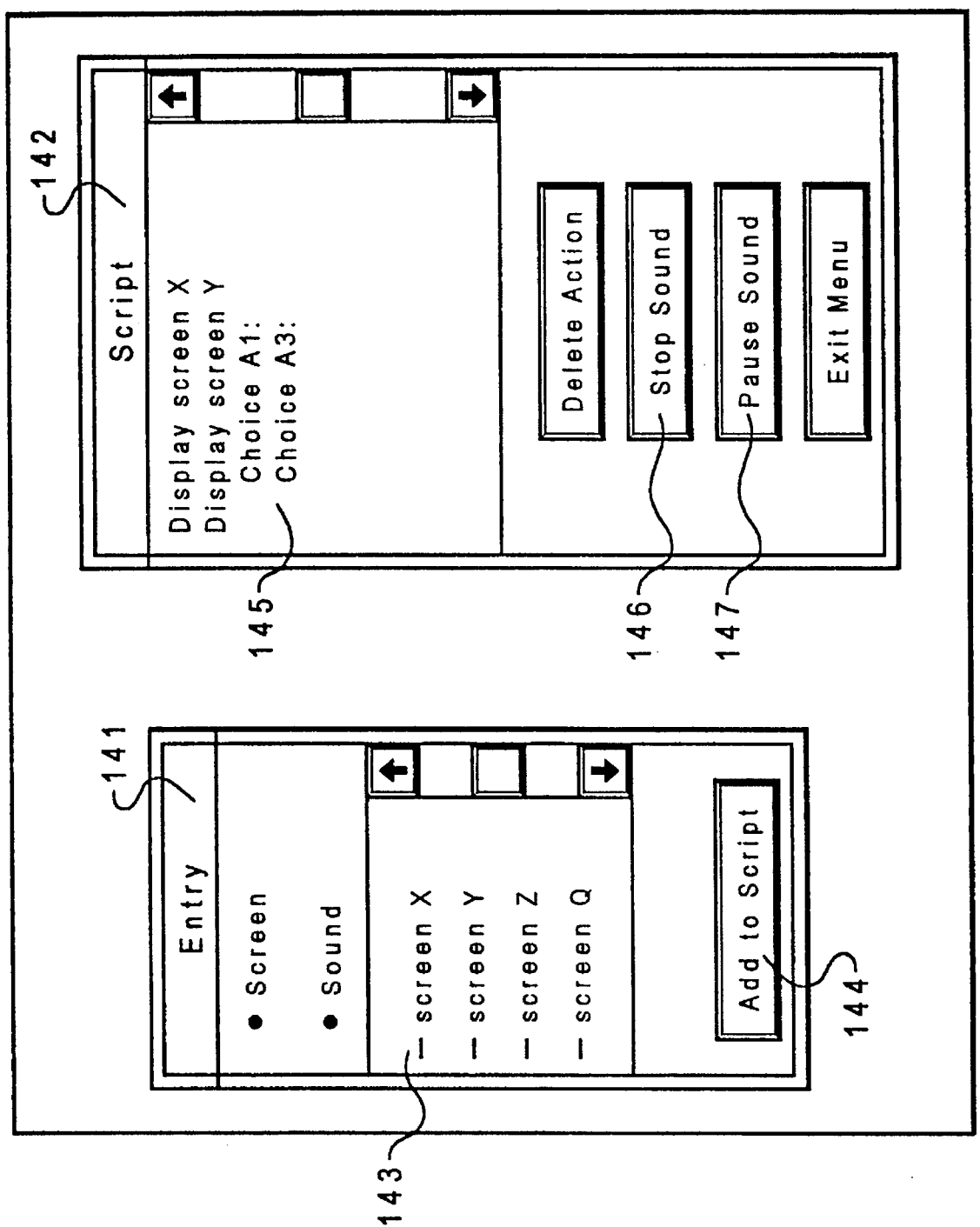
FIGS. 13 and 14 are illustrative examples of the windows displayed on the screen when applying the method of the present invention.

The first step in the link phase is to display two windows to the producer, as seen in FIG. 13. "Entry" window 141 lists the screens and sounds a producer can use when building his script. "Script" window 142 is used to display the script as it is developed by the producer during the link phase.

The next step is to select the first screen to be executed in the application. This is done by selecting the option "Screen" in the "Entry" window, after which all the created screens are displayed in list box 143. The producer then selects the screen he wants to appear first in the finished application and clicks on "Add to script" button 144. The name of this screen will then be displayed in script list box 145 within "Script" window 142, indicating to the user the selected choice. Furthermore, the chosen screen will be executed in the background of the display device, so that the producer can instantly verify the correctness of his selection.

If the producer is not content with this screen, he can delete the entry in the script file from Script window 142 and select another screen from Entry window 141. When the correct screen has been found, the producer selects the following screen in the same way (i.e., by selecting a file name from Entry window 141), which adds the new screen name to the list in Script window 142 and displays the new screen in the background.

When a screen containing active buttons or cells has been selected, the identification names of the buttons or cells are shown indented below the screen entry in Script window 142 as shown in FIG. 13, indicating that the buttons or cells represent user selectable choices and not screens to follow sequentially (i.e., on a "next" command by a user). To link the choices to the screens to be executed when the button or cell is selected, the same procedure is followed as above, i.e., the producer selects the following screen to be displayed from Entry window 141. The screen entries to follow after a choice entry will naturally be indented as well, giving the producer a good overview as he builds up his script.

As an example, after the producer has selected the screen "screen Y", as shown in FIG. 13, script window 142 is updated with the statement "Display screen Y", indicating the new selection. Additionally, the process reads the contents of the link file created during the "Create Screen" phase to determine the existence of any activated buttons or cells. In the considered example, the process will determine that buttons A1 and A3 were activated during the "Create Screen" phase for "screen Y" and will display the result in the Script window 142, preceded by the word "Choice". Therefore, the producer is made aware that the particular screen contains two choices for the end user. The entry "Choice A1" will then become the active entry. In this way the system indicates to the producer in which way to proceed with construction of the scenario.

Figure 14:
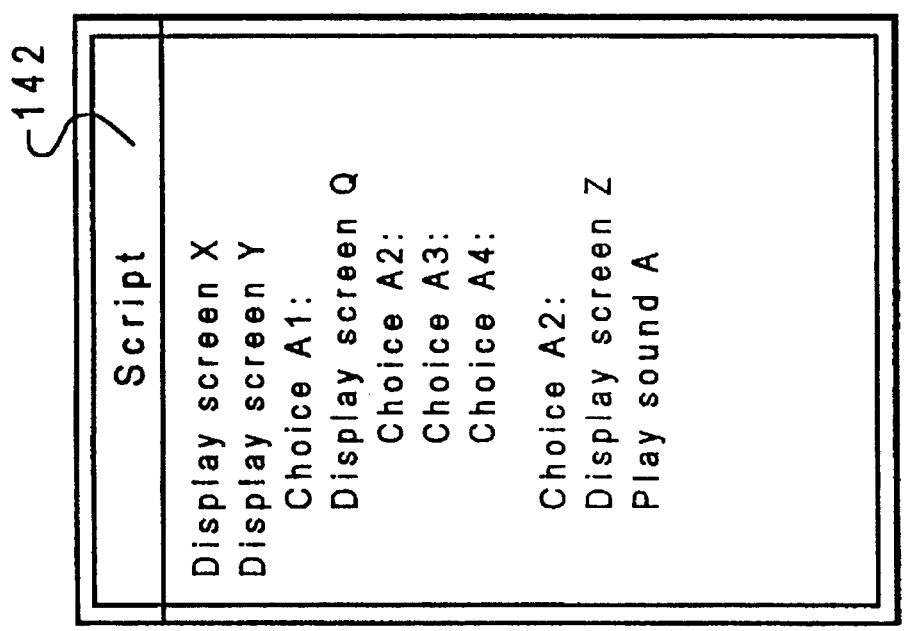

In FIG. 14 the example is continued, showing Script window 142 as it would look if the producer connected "screenQ" to choice A1 of "screenY". In the example, "screenQ" further contains three choice buttons A2–A4, which will then be displayed indented with reference to the entry "screenQ" following the same procedure as above. In this way the process continuously indicates to the producer the steps taken by the "Display" entries in Script window 142 as well as by running the screen in the background. It will also continue to prompt the producer to link the activated buttons and cells when these occur in the selected screens by the "Choice" entries.

The different entries of a script list are differentiated in that the screen names are preceded by the word "Display" and the button and cell identifications are preceded by the word "Choice" as seen in FIG. 13.

When the producer wants to change the entry in the script list with which he is working, he selects and activates this entry by clicking on it. All following actions will then be related to this entry.

Each time a new screen has been selected, the system will create the links for the active navigation buttons.

The "next" button of the screen entry above the latest selected one in the list, will be linked to the latest screen (being the active entry), which in turn will have a link created from its "return" button to the screen above it in the list. This action is taken each time a new screen has been entered to the list, provided that the buttons were activated during the "Create Screen" phase. There is no indication to the producer that the links are created at this time, since all he needs to know is that if activated, these buttons will move a user between screens.

When the "quit" button is active in a screen for the first time during the Link Screens phase, the producer will be prompted to indicate which screen should function as the "quit" screen. After this screen has been defined, the system will link the "quit" button to this screen without having to prompt the producer again.

The "help" button, when activated, will be listed in the same way as a button or cell (i.e., indented below the screen name) so that the producer may assign the screen providing adequate help information for the current screen to the help button. As mentioned earlier, a help screen can be the first screen of a complete new script, if the producer wishes. The only difference is that on the help screens, the "help" button will be crossed over, indicating that pushing this button will end the help application. The system will therefore link each help screen back to the originating screen.

The "return" button will be linked to the same screen to which it belongs. The use of the "return" button could be to replay a video sequence or a sound integrated in the screen.

When the "main menu" button is activated, a link will be made to the initial screen of the application.

The "index" button provides a user with the ability to search for a certain screen using keywords. The button is linked to the index screen, created using the "index" template in FIG. 11.

The index is built up dynamically during the Link Screens phase by giving the producer the choice to add entries in the index each time a new screen is introduced in the script. The producer can enter one or more keywords to relate to the current screen. These keywords are added to an index file in memory in which all entries are sorted alphabetically. In the index file, a link field exists for each text entry. As the keyword is added to the memory, the link field is filled in with the identification of the current screen. During execution of the multimedia application, when a user has selected the index button of any screen, the index screen will be displayed. The user can type a keyword using the keypad in FIG. 11 or may browse through the index using the arrow keys 112 and 113. When the entry the user is seeking is displayed on one of buttons 101–104, labeled A1 to A4, the screen linked to this entry will be executed when the user pushes the button.

The integration of sound to the multimedia application is also performed in the "Link Screens" phase. In Entry window 141 of FIG. 13 the producer has a choice between displaying screen files or sound files. When sound files are listed in Entry window 141, the user can select between them in the same way as when the user is selecting screen files.

A selected sound file will be added to the script at the location of the active screen and will be played as this screen is executed in the application. The sound will then be played until stopped or paused, even if the displayed screen changes. In this way it is possible to play music continuously during the whole execution of the application, if desired by the producer.

The sound can be paused in order to play another sound temporarily and then continue with the original sound. The "Stop Sound" and "Pause Sound" options, selected by pushing buttons 146 and 147 respectively, are integrated in Script window 142 and will be entered into the script when selected. The name of sound files will be preceded by the word "Play". In the example shown in FIG. 14, a sound file called "soundA" has been selected in Entry window 141 and the process indicates that the file will be played together with the screen "screenZ" by adding the entry "Play soundA" below "Display screenZ" in Script window 142.

What is claimed is:

1. A method for creating a multimedia application within a data processing system, said data processing system including a memory and a display device having a display screen, said method comprising:

storing a plurality of multimedia files representative of video or images information in a set of predetermined directories within said memory, wherein each directory within said set of directories is characteristic of one of a plurality of predetermined surface areas utilized to display image or video information contained within said plurality of multimedia files within said display screen;

in response to a request to create a multimedia application, providing a set of multimedia templates which are each comprised of a plurality of possibly overlapping zones, each of said plurality of zones having one among said plurality of predetermined surface areas;

providing a user with an opportunity to select a multimedia template within said set of said multimedia templates and displaying said selected multimedia template within said display screen;

in response to a selection of a particular zone among said plurality of zones within said selected multimedia template, displaying a window within said display screen containing a listing of multimedia files stored within a directory characteristic of a predetermined surface area of said particular zone;

in response to a selection of a multimedia file within said listing of multimedia files, automatically storing an entry in memory such that said selected multimedia file is associated with said particular zone;

constructing a screen of said multimedia application by repeating said steps of displaying a window and automatically storing an entry;

thereafter, in response to a request to build a script of said multimedia application, displaying a screen list containing a plurality of screens that can be included within said script;

in response to a selection of a particular screen among said plurality of screens within said screen list, adding said particular screen to a script list containing each selected screen and each linking navigation button within each screen of said script; and associating each linking navigation button within said script list with a screen within said script to be displayed when said each linking navigation button is activated.

2. The method for creating a multimedia application of claim 1, wherein the step of displaying a window containing a listing of multimedia files stored within a directory comprises:

displaying a separate listing of video files, images files, and animation files.

3. The method for creating a multimedia application of claim 2, wherein the step of providing a set of multimedia templates includes the step of first displaying a particular multimedia template which is most frequently utilized for creating a particular multimedia screen.

4. The method for creating a multimedia application of claim 1, and further comprising:

in response to said selection of a multimedia file within said listing of multimedia files that contains image or video information, automatically displaying said image or video information within said particular zone.

5. The method for creating a multimedia application of claim 4, and further comprising:

in response to a second selection of said particular zone following said selection of a multimedia file within said listing of multimedia files, automatically removing said entry from memory and discontinuing said display of said image or video information within said particular zone.

6. The method for creating a multimedia application of claim 1, wherein said particular zone comprises a background of a first screen and said multimedia file associated in said memory with said particular zone representative of a second screen.

7. A multimedia data processing system, comprising:

a display device having a display screen;

a memory which stores a plurality of multimedia files representative of video or images information in a set of predetermined directories, wherein each directory within said set of directories is characteristic of one of a plurality of predetermined surface areas utilized to display image or video information contained within said plurality of multimedia files within said display screen;

means, responsive to a request to create a multimedia application, for providing a set of multimedia templates which are each comprised of a plurality of possibly overlapping zones, each of said plurality of zones corresponding to one among said plurality of predetermined surface areas;

means for providing a user with an opportunity to select a multimedia template within said set of said multimedia templates;

means, responsive to a selection of a particular zone among said plurality of zones within said selected multimedia template, for displaying a window within said display screen containing a listing of multimedia files stored within a directory characteristic of a corresponding predetermined surface area of said particular zone;

means for automatically storing an entry in said memory such that a selected multimedia file is associated with said particular zone in response to a selection of said multimedia file within said listing of multimedia files;

means for constructing a screen of said multimedia application by associating multimedia files with selected zones within said selected multimedia template;

means for constructing a script that indicates an order in which a plurality of screens will be viewed by an end user of said multimedia application; and means for storing said script in said memory.

8. The multimedia system of claim 7, wherein said means for displaying a window containing a listing of multimedia files stored within a directory comprises means for displaying a separate listing of video files, images files, and animation files.

9. The multimedia system of claim 7, wherein each multimedia template within said set of multimedia templates includes a navigation bar that includes one or more buttons, wherein each of said buttons on said navigation bar has a predetermined functionality.

10. The multimedia system of claim 7, wherein at least one multimedia template within said set of multimedia templates includes a zone associated with a predetermined input.

\* \* \* \* \*